US005989686A

United States Patent [19]

Song et al.

[11] Patent Number: 5,989,686

[45] Date of Patent: Nov. 23, 1999

[54] COLOR ELECTROPHOTOGRAPHIC MEDIA

[75] Inventors: Jian Cheng Song, Coventry, R.I.; Betty Ann Lyon, Rehoboth, Mass.

[73] Assignee: Arkwright Incorporated, Fiskeville, R.I.

[21] Appl. No.: 08/861,702

[22] Filed: May 22, 1997

[51] Int. Cl.$^6$ .......... B32B 9/00

[52] U.S. Cl. .......... 428/195; 428/199; 428/204; 428/206; 428/207; 428/212; 428/220; 428/323; 428/327; 428/411.1; 430/47; 430/126

[58] Field of Search .......... 428/195, 323, 428/411.1, 206, 207, 327, 913, 199, 204, 212, 220; 430/126, 47

[56] References Cited

U.S. PATENT DOCUMENTS

| | | | |
|---|---|---|---|
| 3,854,942 | 12/1974 | Akman | 430/37 |
| 5,045,424 | 9/1991 | Rimai et al. | 430/126 |
| 5,208,093 | 5/1993 | Carls et al. | 428/195 |
| 5,229,188 | 7/1993 | Takeuchi et al. | 428/195 |
| 5,582,943 | 12/1996 | Kato et al. | 430/66 |

FOREIGN PATENT DOCUMENTS

| | | |
|---|---|---|
| 0349227A2 | 1/1990 | European Pat. Off. . |
| 0588723A1 | 3/1994 | European Pat. Off. . |
| 0617333A2 | 9/1994 | European Pat. Off. . |
| A2 06 33508 | 1/1995 | European Pat. Off. . |
| A1 06 57782 | 6/1995 | European Pat. Off. . |
| 0809154A2 | 11/1997 | European Pat. Off. . |
| WO 9113385A1 | 9/1991 | WIPO . |
| WO 9602023 | 1/1996 | WIPO . |
| WO 9712283A1 | 4/1997 | WIPO . |

*Primary Examiner*—Timothy Speer
*Assistant Examiner*—Abraham Bahta
*Attorney, Agent, or Firm*—Birch, Stewart, Kolasch & Birch, LLP

[57] ABSTRACT

A color electrophotographic recording medium is disclosed that contains a polymeric base film substrate having coated on a side thereof a toner-receptive coating. The coating contains at least one low molecular weight toner-compatible resin segment and at least one high molecular weight thermoplastic resin segment, with the toner-compatible resin segment having a number average molecular weight in the range of about 1,000 g/mole to about 10,000 g/mole, and the thermoplastic resin segment having a number average molecular weight in the range of about 10,000 g/mole to about 500,000 g/mole. Optionally, the toner-receptive coating layer can also contain a polymeric particulate, an anti-static agent, and a surfactant.

11 Claims, No Drawings

COLOR ELECTROPHOTOGRAPHIC MEDIA

FIELD OF THE INVENTION

This invention relates to media used in color electrophotographic copying and/or printing and more particularly to polymeric media for use in color electrophotographic copying and/or printing.

BACKGROUND OF THE INVENTION

Electrophotography is the most important non-impact printing technology for today's reprographic industries. The electrophotographic copying or printing process normally creates images on a coated polymeric substrate in five steps, with the individual steps of the process generally include the following: (1) depositing a uniform electric charge onto a photoconductor drum in the dark; (2) creating an electrostatic latent image on the photoconductor by exposing the photoconductor to an oscillating narrow laser beam that is turned on and off digitally; (3) exposing the photoconductor to toner particles, wherein toner particles having the correct polarity adhere to the exposed latent image; (4) passing the media to be printed between the photoconductor and a transfer corona to cause the toner particles to transfer from the photoconductor to the media; and (5) fixing the transferred toner particles to the media by one of various procedures known in the art.

Technological advances in electrophotography in recent years have brought an increase in the popularity of color electrophotographic copiers and printers. Unlike a monochrome copier wherein only one black toner is employed, full color copying generally requires four toners including yellow, magenta, cyan, and black. Since a separate imaging process is required for each of the four toners, color copiers and printers are much slower and more expensive than their monochrome counterparts. The recording media suitable for color copiers or printers must meet more stringent requirements to provide a true full-color reproduction of the original.

One important use of color electrophotographic copiers or printers is to make overhead projection transparencies wherein a transparent receptor film is used as the media to receive the image of the original. There is increasing demand for high performance transparent receptor film for color overhead projection transparency uses. Current commercial receptor media consist of a polymeric substrate such as polyethylene terephthalate (PET) and one or more thin layers of organic coatings coated thereon for better imaging quality and feeding performance. Uncoated PET films give poor toner adhesion and image quality and unreliable feeding performance.

Current commercial receptor media are frequently deficient in color fidelity, color density, toner adhesion, and scratch resistance. Unreliable transport of the media through the copier or printer due to inappropriate surface properties is also a common problem. Feedability is the most important design parameter since if the imaging media does not feed through a copier or printer none of the media's other qualities is relevant.

Good toner adhesion is also very important. If the toner does not adhere well to the receptor layer, incomplete toner transfer from the photoconductor to the receptor layer can occur. This can result in hollow characters and poor image resolution. Poor toner adhesion can also result in images being abraded off during handling.

Since transparencies are used for overhead projection, it is essential to design a receptor layer that gives high image quality and a true projection of the original. Poor color fidelity is often related to improper fusing of the toner particles in the toner-receptive coating.

Good thermal and mechanical stabilities are also necessary in order to avoid scratches, buckling, and loss of planarity during or after the converting, copying, and handling processes.

Although various recording media have been proposed for color electrophotographic copying or printing applications, none of them has satisfied the substantial need in the art.

U.S. Pat. No. 3,854,942 discloses a transparency for use in a multi-colored xerographic reproduction process comprising a transparent, thermoplastic film sheet having at least one surface coated with a mixture consisting of a vinyl chloride-acetate copolymer resin and an acrylic resin in a weight ratio of between about 6:4 and 7:3, with a wetting agent in said mixture in an amount between about 2.5 to 25% by weight of said mixture. A percentage of a particulate material is also incorporated in the coating to reduce static charge on the transparency and permit easier handling thereof.

U.S. Pat. No. 5,229,188 discloses a transparent laminate film suitable to receive a color toner image, having disposed thereon at least a first transparent layer containing a heat-resistant transparent resin, and a second transparent layer containing a second transparent resin, wherein the transparent resin of the second transparent resin layer has a compatibility with the binder resin of a toner to be fixed thereon, and a larger storage elasticity modulus than that of the binder resin of the toner at a fixing temperature of the toner.

U.S. Pat. No. 5,208,093 discloses a film used for electrographic printing, wherein the film is coated with a polymeric receptor layer having an equivalent or lower storage elasticity modulus than a toner resin used for forming images on said film.

European Patent Application No. 0 657 782 A1 discloses a toner imageable film comprising a transparent film substrate bearing on one major surface thereof a toner receiving layer, wherein the toner receiving layer has a lower softening point than the toner with which it is used.

International Patent Application WO 96/02023 discloses an image receiving film for electrography which can prevent the occurrence of an oil pooling phenomenon by adding 0.1–100 parts by weight, based on 100 parts by weight of image-formable resin, of a porous silica having a surface area of not less that 350 $m^2/g$ and an average particle diameter in the range of from 0.05 to 100 micrometers and/or polysiloxane particles.

European Patent Application No. 0 633 508 A2 discloses an image-receiving sheet comprising a substrate sheet, an image receiving layer composed mainly of a polyester resin comprising an acid moiety and a diol moiety of a modified bisphenol A of Formula (I) as disclosed therein, and an opaque porous resin layer as a detection mark that can turn transparent upon heating. The opaque porous resin layer is formed by coating a resin varnish comprising a resin selected from an acrylic resin, a polyester resin, a vinyl chloride/vinyl acetate copolymer resin, and mixtures thereof, a good solvent having a relatively low boiling point and a poor solvent having a relatively high boiling point on said image-receiving sheet and drying the resultant coating.

SUMMARY OF THE INVENTION

It is an object of the present invention to provide color electrophotographic copying and printing media, which comprises a film substrate having an image-receiving layer coated on a surface thereof, and which possesses improved color image quality and toner adhesion while maintaining reliable transport qualities.

The objective of the invention is attained by selecting polymers for the image-receiving layer having particular molecular weight parameters and by controlling the thickness of the image-receiving layer. The qualities of color fidelity, color density, toner adhesion, and scratch resistance are controlled and optimized by blending at least one low molecular weight toner-compatible resin (i.e., a soft molecular segment) with at least one high molecular weight thermoplastic resin (i.e., a hard molecular segment). The low molecular weight toner-compatible resin is selected to provide superior color fidelity and toner adhesion. The high molecular weight thermoplastic resin is selected to increase mechanical strength and thermal stability so that the receptor coating is less susceptible to damages during the manufacturing, shipping, and handling processes.

Preferably the coating contains (a) from about 40–90 parts by weight, based on the amount of solids in the coating, of the at least one toner compatible resin segment, with the same preferably having a number average molecular weight in the range of about 1,000 g/mole to about 10,000 g/mole; and (b) from about 1 to 40 parts by weight, based on the amount of solids in the coating, of the at least one thermoplastic resin segment, with the same having a number average molecular weight ranging from about 10,000 g/mole to about 500,000 g/mole.

Also, it is preferable that the thickness of the toner coating be from about 1 to about 3 micrometers.

DETAILED DESCRIPTION OF THE INVENTION

The media for color electrophotographic copying or printing according to the invention comprises a transparent polymeric substrate having a coating composition disposed thereon which enhances color image quality, toner adhesion and which promotes reliable transport of the media through the copier or printer. The coating composition comprises a particular blend of at least one low molecular weight toner compatible resin (i.e., soft polymeric) segment and at least one high molecular weight thermoplastic resin (i.e., hard polymeric) segment dispersed or dissolved in a suitable vehicle. The soft resin segment provides the coating with excellent color fidelity and good toner adhesion, while the thermoplastic resin segment provides mechanical strength and thermal stability to the coating.

As a result the use of the two segments together in the inventive coating allows for the production of copies and prints having advantageous properties.

The toner-receptive coating layer of the present invention in a preferred embodiment contains from about 40 to 90 parts of the at least one low molecular weight toner compatible resin segment, with the same having a number average molecular weight in the range of about 1000 g/mole to about 10,000 g/mole. Most preferably the at least one toner compatible resin (i.e., soft polymeric) segment is a bisphenol A/epichlorohydrin based epoxy resin.

The toner-receptive coating layer of the present invention also contains, preferably, about 1 to 40 parts of the at least one high molecular weight thermoplastic resin segment, with the same having a number average molecular weight ranging from about 10,000 g/mole to about 500,000 g/mole. Most preferably at least one thermoplastic resin (i.e., hard polymeric) segment is selected from the group consisting of polyvinyl chloride, polyvinylidene chloride, polyvinyl acetate, polymethylmethacrylate, polychloroprene and hydroxyl modified copolymer of vinyl chloride and vinyl acetate, acrylic copolymers and chlorinated rubbers.

The coating on the polymeric substrate, according to the invention, has associated therewith the following advantageous characteristics: excellent color image quality, good toner adhesion, reliable transport qualities, improved scratch resistance properties, and additionally provides excellent performance under various environmental conditions.

The thickness of the toner-receptive coating layer of the media is preferably from about 1 to about 3 micrometers.

Optionally, there are also included in the toner-receptive coating a polymeric particulate, and an anti-static agent, and a surfactant.

The polymeric particles, when present in the coating layer are used to control the surface properties of said media by reducing static, avoiding blocking and promoting slip. The polymeric particles are also useful in providing suitable friction to help propel the toner-receptive media through a color electrophotographic copier or printer. Preferably, when particulates are used in the toner-receptive coating layer of the present invention, they are present in an amount of about 0.1 to about 5 parts, by weight based on the total amount of solids in the coating layer, and possess an average particle size in the range between about 4 to about 20 micrometers in diameter. The polymeric particulates are preferably selected from the group consisting of polyolefins, polystyrene, starch, polyurethane, poly(methyl methacrylate), polytetrafluoroethylene, and the like. Inorganic particulates such as silica, calcium carbonate, kaolin, aluminum hydroxide and the like may also be used in the coating formulation.

The anti-static agent, when present in the toner-receptive coating layer of the present invention, is preferably used in an amount of about 0.1 to about 10 parts by weight, based on the total weight of solids in the coating layer. Suitable agents include quaternary salt type cationic anti-static agents, and the like, including alkali metal and ammonium salts of poly-(styrene sulfonic acid), sulfonated styrene/maleic anhydride copolymer, poly(acrylic acid), poly-(methacrylic acid), poly (vinyl phosphate) and free acids thereof, copolymers of dimethyl allyl ammonium chloride and diacetone acrylamide, quaternary acrylics, copolymers of dimethyl diallyl ammonium chloride and N-methylacrylamide, poly(dimethyl diallyl) ammonium chloride, quaternary cellulose acetate, and other conductive materials known in the art. Such anti-static agents may be incorporated into both the image coating layer and an anti-static backing layer if so desired. Surface active agents, such as wetting agents, dispersing agents, defoaming agents and anti-foaming agents, may be incorporated into the coating to improve coating surface properties and coatability. Preferred surface active agents are, for example, BYK 306 (polyether modified dimethyl polysiloxane copolymer wetting agent) sold by BYK-Chemie, FC-430 (fluorocarbon surface active agent) sold by 3M, and TEGO Wet 250 and 260 (polyether modified dimethyl polysiloxane copolymer wetting agents) sold by Tego-Chemie.

The polymeric base film substrate of the media of the invention is made of a polymeric material (preferably transparent) having suitable physical characteristics so as to be resistant to tearing and resistant to damage by heat encountered in a color electrophotographic copier or printer, particularly in a fixing unit thereof. Suitable polymeric materials for use as the base film substrate generally include thermoplastic polymers, such as polyesters, polysulfones, poly(vinylchloride), poly(vinyl acetate), polycarbonates, polymethylmethacrylate, cellulose esters and others. A polyethylene terephthalate film is a particularly preferred base film substrate. The thickness of the base film substrate is not particularly restricted, but should generally be in the range of about 2 to about 10 mils, and is most preferably about 4 mils.

The polymeric base film substrate may be pretreated to enhance adhesion of the polymeric coating layer thereto. Preferably, the non-imaging side of the polymeric base film substrate is coated with a polymeric antistatic coating to improve its antistatic and handling properties.

Preferably, the surface resistivity of both sides of the media of the present invention is within the range of $1\times10^{10}$ to $1\times10^{13}$ ohms/square at 50% relative humidity. In a further preferred embodiment, the value of the surface resistivity of the toner-receptive coating should be equal to or less than the value of the surface resistivity of the non-image side of the media of the present invention.

Surface resistivity is measured using a Keithley Model 485 autoranging picoammeter with a Keithley Model 6105 resistivity adapter and a Keithley Model 247 high voltage supply.

The toner-receptive coating layer of the present invention is applied to the polymeric base film substrate in order to produce one of the inventive medium encompassed hereby. For example, any of a number of coating methods may be employed to coat the toner-receptive coating onto the polymeric substrate including roller coating, extrusion coating, wire-bar coating, dip-coating, rod coating, doctor coating, or gravure coating. Such techniques are well known in the art. Such methods may also be used to coat an antistatic coating on a surface of the inventive media if so desired.

The following examples are further illustrative of the present invention and are provided as a means to ensure that those desiring to practice the present invention are fully enabled to practice the same. However, these examples are by no means limiting to the scope of the present invention as otherwise disclosed or claimed herein, including its equivalent embodiments.

EXAMPLE I

A coating composition having the following formulation is prepared to make the toner-receptive coating layer:

| | |
|---|---|
| Methyl Propyl Ketone | 82.76 parts |
| Epon 1004F[1] | 9.00 parts |
| Epon 1007F[2] | 6.00 parts |
| Pergut S 20[3] | 0.30 parts |
| Soken MR10G[4] | 0.10 parts |
| Shamrock SST2SP5[5] | 0.05 parts |
| Cyaguard 609[6] | 1.75 parts |
| BYK 306[7] | 0.04 parts |

[1]Epoxy resin (Molecular weight = 1,750 g/mol) sold by Shell Chemical Company.
[2]Epoxy resin (Molecular weight = 4,000 g/mol) sold by Shell Chemical Company.
[3]Chlorinated rubber (Molecular weight = 145,000 g/mol) sold by Bayer.
[4]Polymethylmethacrylate pigments sold by Esprit Chemical Company.
[5]Polytetrafluoroethylene pigment sold by Shamrock Chemical Company.
[6]Quaternary salt type cationic anti-static agent sold by Cytec Inc.
[7]Polyether modified dimethyl polysiloxane copolymer wetting agent sold by BYK-Chemie.

Epon 1004F and Epon 1007F are added to a drum containing Methyl Propyl Ketone solvent and mixed for 30 minutes. The chlorinated rubber (Pergut S-20), polymethylmethacrylate and polytetrafluoroethylene pigments are then added to the drum under agitation and mixed for 30 minutes. The quaternary salt anti-static agent (Cyaguard 609) and the wetting agent (BYK 306) are then added to the drum with agitation. The resulting coating solution is applied to a polyethylene terephthalate film (ICI America, Inc.) with an anti-static backcoat. The coating is dried at 120° C. for 1.5 minutes.

EXAMPLE II

A coating composition having the following formulation is prepared to make the toner-receptive coating layer:

| | |
|---|---|
| PM solvent | 70.23 parts |
| Methyl Ethyl Ketone | 17.32 parts |
| Epon 1002F[1] | 7.00 parts |
| UCAR Solution Vinyl Resin VYES-4[2] | 3.00 parts |
| Pergut S 20[3] | 0.10 parts |
| Soken MR10G[4] | 0.10 parts |
| Shamrock SST2SP5[5] | 0.05 parts |
| Cyaguard SP[6] | 2.50 parts |
| BYK-306[7] | 0.05 parts |

[1]Epoxy resin (Molecular weight = 1,750 g/mol) sold by Shell Chemical Company.
[2]Hydroxyl modified copolymer of vinyl chloride-vinyl acetate (Molecular weight = 4,000 g/mol) sold by Union Carbide.
[3]Chlorinated rubber (Molecular weight = 112,000 g/mol) sold by Bayer.
[4]Polymethylmethacrylate pigments sold by Esprit Chemical Company.
[5]Polytetrafluoroethylene pigment sold by Shamrock Chemical Company.
[6]Quaternary salt type cationic anti-static agent sold by Cytec Inc.
[7]Polyether modified dimethyl polysiloxane copolymer wetting agent sold by BYK-Chemie.

Epon 1002F and UCAR solution vinyl resin VYES-4 are added to a drum containing PM solvent and methyl ethyl ketone and mixed for 30 minutes. The chlorinated rubber (Pergut S-20), polymethylmethacrylate and polytetrafluoroethylene pigments are then added to the drum under agitation and mixed for 30 minutes. The quaternary salt anti-static agent (Cyaguard SP) and the wetting aid (BYK 306) are then added to the drum with agitation. The resulting coating solution is applied to a polyethylene terephthalate film (ICI America, Inc.) with an anti-static backcoat. The coating is dried at 120° C. for 1.5 minutes.

EXAMPLE III

A coating composition having the following formulation is prepared to make the toner-receptive coating layer:

| | |
|---|---|
| PM solvent | 71.08 parts |
| Methyl Ethyl Ketone | 18.00 parts |
| Epon 1007F[1] | 7.00 parts |
| Acryloid B44[2] | 3.00 parts |
| Soken MR10G[3] | 0.10 parts |
| Shamrock SST2SP5[4] | 0.05 parts |
| Cyaguard 609[5] | 0.77 parts |

[1]Epoxy resin (Molecular weight = 4,000 g/mol) sold by Shell Chemical Company.
[2]Acrylic resin (Molecular weight = 40,000 g/mol) sold by Rhom & Haas Company.
[3]Polymethylmethacrylate pigments sold by Esprit Chemical Company.
[4]Polytetrafluoroethylene pigment sold by Shamrock Chemical Company.
[5]Quaternary salt type cationic anti-static agent sold by Cytec Industries, Inc.

Epon 1007F and Acryloid B44 are added to a drum containing PM solvent and MEK and mixed for 30 minutes. Polymethylmethacrylate and polytetrafluoroethylene pigments are added to the drum under agitation and mixed for 15 minutes. The quaternary salt anti-static agent (Cyaguard 609) is then added to the drum with agitation. The resulting coating solution is applied to a polyethylene terephthalate film (ICI America, Inc.) with an anti-static backcoat. The coating is dried at 120° C. for 1.5 minutes.

Each of the coated films of Examples I–III provide excellent image quality and toner adhesion, good scratch resistance and reliable feeding performance when imaged in a color electrophotographic copier, such as a XEROX 5760 Majestick color laser copier or CANON 700/800 color laser copier.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A color electrophotographic recording medium, comprising a polymeric base film substrate having coated on a surface thereof, a toner-receptive coating comprising:

a) about 65 to about 95% by weight of a low molecular weight toner-compatible resin segment having a number average molecular weight in the range of about 1,000 g/mole to about 10,000 g/mole;

b) about 1 to about 30% by weight of a high molecular weight thermoplastic resin segment having a number average molecular weight in the range of about 10,000 g/mole to about 500,000 g/mole;

c) about 1 to about 3% by weight of polymeric particulate; and d) about 3 to about 12% by weight of an anti-static agent.

2. The recording medium of claim 1, wherein the toner-receptive coating further comprises a surface active agent.

3. The recording medium of claim 1, wherein the toner-compatible resin segment is bisphenol A/epichlorohydrin based epoxy resin.

4. The recording medium of claim 1, wherein the thermoplastic resin segment is selected from the group consisting of polyvinyl chloride, polyvinylidene chloride, polyvinyl acetate, polymethylmethacrylate, polychloroprene, acrylic copolymers, and chlorinated rubbers.

5. The recording medium of claim 1, wherein the polymer particulate is a polymeric compound selected from the group consisting of polyolefins, polystyrene, starch, polyurethane, poly(methyl methacrylate), and polytetrafluoroethylene.

6. The recording medium of claim 5, wherein the polymer particulate has an average particle size in the range of about 4 to about 20 micrometers.

7. The recording medium of claim 1, wherein the thickness of the toner-receptive coating is from about 1 to about 3 micrometers.

8. The recording medium of claim 1, wherein the surface resistivity of the medium is within the range of $1\times10^{10}$ to $1\times10^{13}$ ohms/square at 50% relative humidity.

9. The recording medium of claim 1, wherein the polymeric base film is a polyester film.

10. The recording medium of claim 9, wherein the polyester film has a thickness of about 2 to about 10 mils.

11. The recording medium of claim 10, wherein the polyester film has a thickness of about 4 mils.

* * * * *